219-121 SR
MTR05 XR 3,978,840

United States Patent [19]

Schleiermacher

[11] 3,978,840

[45] Sept. 7, 1976

[54] CYLINDER HEAD WITH WELDED-ON CYLINDER AND METHOD OF MAKING SAID WELDED UNIT

[75] Inventor: Herbert Schleiermacher, Bruhl, Germany

[73] Assignee: Klockner-Humboldt-Deutz Aktiengesellschaft, Cologne, Germany

[22] Filed: Aug. 21, 1974

[21] Appl. No.: 499,543

[30] Foreign Application Priority Data

Aug. 21, 1973 Germany .......................... 2342114

[52] U.S. Cl. .................... 123/193 CH; 219/121 EB
[51] Int. Cl.[2] ...................... F02F 1/04; B23K 15/00
[58] Field of Search ..... 123/193 CH, 193 H, 193 C, 123/41.56; 219/121 EB; 29/156.4 R

[56] References Cited

UNITED STATES PATENTS

| | | | |
|---|---|---|---|
| 1,665,468 | 4/1928 | Murray | 29/156.4 R |
| 2,883,977 | 4/1959 | Langmaier | 123/193 CH |
| 3,319,536 | 5/1967 | Kohl et al. | 219/121 EB |
| 3,436,515 | 4/1969 | Sayer et al. | 219/121 EM |
| 3,661,135 | 5/1972 | Weiss | 123/193 CH |
| 3,799,140 | 3/1974 | Vogelsang | 123/191 S |

*Primary Examiner*—Charles J. Myhre
*Assistant Examiner*—William C. Anderson
*Attorney, Agent, or Firm*—Walter Becker

[57] ABSTRACT

A cylinder is connected to the cylinder head by electron beam welding along a welding seam extending from the exterior of the cylinder to an annular slot. The annular slot is provided in that end face of the cylinder which is adjacent the cylinder head and having its extension of depth extending in the longitudinal direction of the cylinder.

7 Claims, 4 Drawing Figures

CYLINDER HEAD WITH WELDED-ON CYLINDER AND METHOD OF MAKING SAID WELDED UNIT

The present invention relates to a cylinder head with welded-on cylinder pipe for reciprocable cylinder piston engines.

With air cooled reciprocable piston internal combustion engines, frequently leaks occur at the cylinder surface between the cylinder head of aluminum and the cylinder tube of grey cast iron. Particularly frequently will this defect occur with internal combustion engines equipped with turbulence or ante chambers because the sealing surface is locally intensively heated by the heat concentration within the region of the ante chamber. German Offenlegungsschrift No. 1,908,411 describes a cylinder head having connected thereto a cylinder pipe by friction welding (Reibschweissen). According to this welding method, the connecting surfaces must be planed and cannot carry out any centering functions. Furthermore, this welding method is applicably only to rotational symmetric bodies to that as a rule it is not applicable for air cooled cylinder pipes or tubes.

It is furthermore known to interconnect elements of different metallic materials by electron beam welding. In view of the high heat concentration and the narrow welding zone, only an immaterial distortion occurs so that the structural elements can be finish machined prior to the welding operation. However, in view of the high temperature gradients in the workpiece, it cannot be avoided that a hardening texture forms which has the tendency to form tears due to temperature change stresses.

It is, therefore, an object of the present invention to take advantage of the electron beam welding also for cylinder heads of the above mentioned type. This object and other objects and advantages of the invention will appear more clearly from the following specification in connection with the accompanying drawings, in which.

Figure 1:
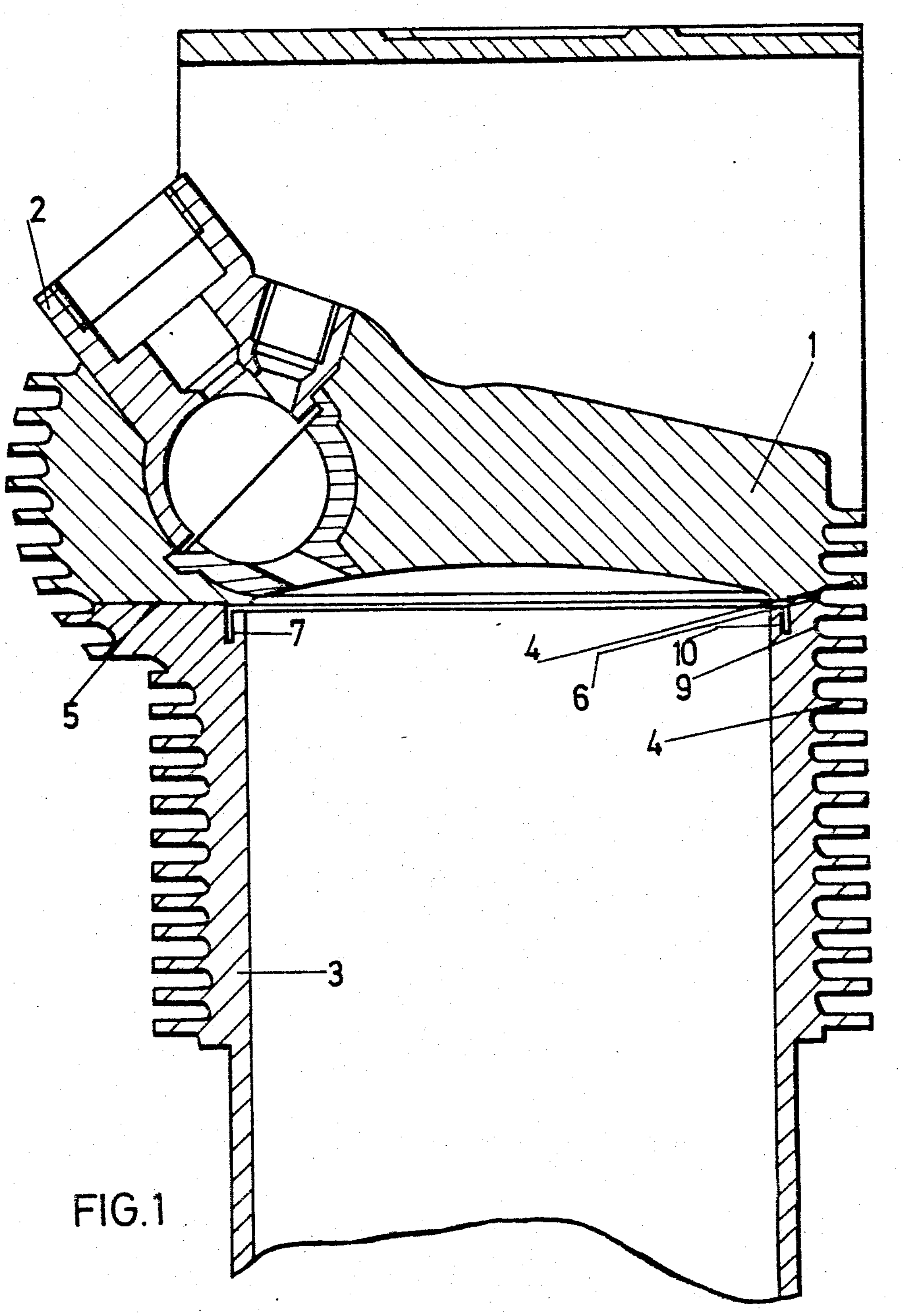
FIG. 1 represents a diagrammatic cross section through a cylinder-head construction according to the invention.

The cylinder head according to the present invention with welded-on cylinder tube for reciprocable internal combustion engines is characterized primarily in that the cylinder tube is connected to the cylinder head by electron beam welding and that the welding seam extends from the outer circumference of the cylinder tube or pipe to a slot which extends parallel to the cylinder axis and also extends over the circumfernce of the cylinder.

Employing electron beam welding makes it possible to finish machine the cylinder tube and the cylinder head prior to welding these parts together. Both parts may have customary centering means by which they can easily be fitted into each other prior to the welding operation. The slot the extension of depth of which is in the longitudinal direction of the cylinder tube, e.g., parallel to the cylinder axis will within the region of the welding seam bring about that that portion of the cylinder tube which faces the combustion chamber will not be affected as to its texture or grain by the welding seam and will be completely free from distortion. Heat stresses which in spite of the electron beam welding might occur within the region of the welding seam do no longer act upon the finish machine cylinder tube running or sliding surface. Furthermore, the slot will prevent metallic droplets which occur during the welding operation from reaching the running surface of the cylinder tube. Finally, the slot forms a heat protection or heat barrier relative to the welding seam so that the danger of forming tears will practically be avoided.

It has been found advantageous so to dimension the slot that it will have an approximate depth of 6 millimeters and an approximate width of from 0.2 to 1 millimeter. For purposes of reducing the dead space as well as avoiding carbon deposits, it is suggested according to a further development of the invention to embed a metallic strip in the slot.

It is likewise advantageous so to arrange the construction that the web of the cylinder tube which is located outside said slot will project beyond the inner web and with its inner surface will sealingly engage a centering area around the cylinder head. In this way it will be possible within the region of the welding seam to sealingly introduce the cylinder head into a vacuum chamber and to feed a heat carrier for preheating the cylinder tube through the cylinder tube under normal conditions during the welding operation. As heat carrier there may be employed a water or air jet. Furthermore, the cylinder tube will be able to rest against the cylinder head, and the stresses which occurred due to the welding will not act upon the finish machined cylinder running surface.

In order to assure that the inner web can freely expand and is not exposed to axial forces, it is suggested that between the end face of the inner web and the cylinder head there remain a gap of approximately 0.1 mm.

With reciprocable piston internal combustion engines, frequently cylinder liners are employed which are inserted in dry condition into a mantle or with air cooled internal combustion engines are also frequently cast into the mantle. In this instance it is expedient that the slot is arranged in the separating gap between the mantle and the liner.

Referring now to the drawing in detail, the structure shown therein comprises a cylinder head 1 having cast therein a turbulence chamber 2. The cylinder head 1 is connected to the cylinder tube 3 by electron beam welding. The cylinder tube 3 and the cylinder head 2 are equipped with cooling fins 4. The welding seam 5 reaches from the outer circumference 6 to a slot 7 which extends parallel to the cylinder axis and extends over the circumference of the cylinder tube 3.

Figure 2:
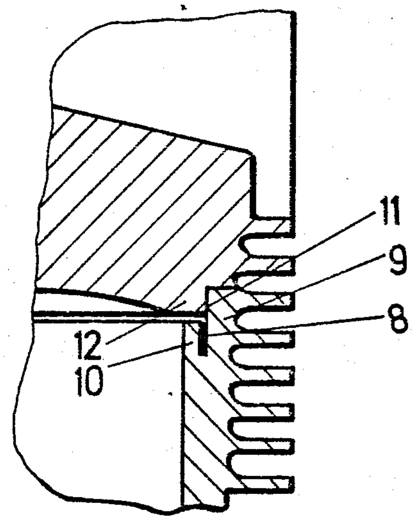
FIGS. 2–4 show portions of cross sections of modified cylinder-head constructions according to the invention.

According to the embodiment of FIG. 2, a metal strip 8 is inserted into the slot 7. Furthermore, with this embodiment as well as with the embodiment according to FIGS. 3 and 4, the web 9 of the cylinder tube 3, which web is located outside the slot 7, is higher than the inner web 10. Furthermore, the outer web 10 has its inner surface 11 in close engagement with a centering portion 12 of the cylinder head 1 which portion 12 extends all the way around.

Figure 3:
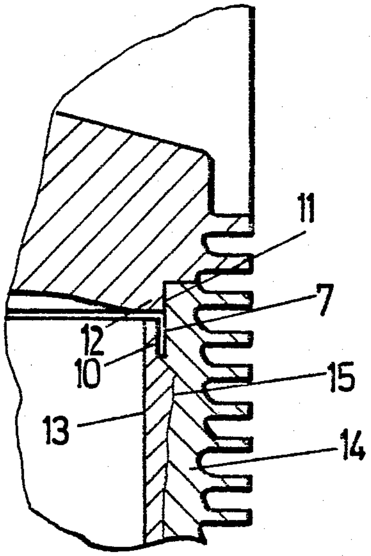
Figure 4:
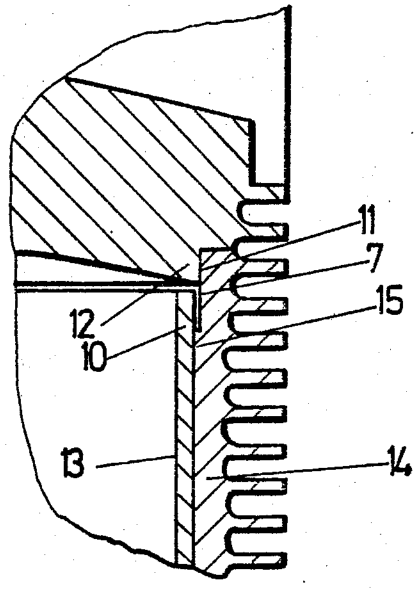

According to the embodiment of FIGS. 3 and 4, the cylinder tube comprises a liner and a mantle 14 which may be connected to each other by any suitable known casting method or by press or slide fit. In these instances, the slot 7 is located in the separating gap 15 between the liner 13 and the mantle 14.

It is, of course, to be understood that the present invention is, by no means, limited to the specific showing in the drawings, but also comprises any modifications within the scope of the appended claims.

What I claim is:

1. In combination with a cylinder head, tubular cylinder means having one end face electrobeam welded to said cylinder head along a welding seam, said cylinder means having an annular slot provided in said one end portion of said tubular cylinder means to avoid surface post-working and having its extension of depth in the longitudinal direction of said tubular cylinder means, said welding seam extending from the outer circumference of said tubular cylinder means to said slot.

2. A unit in combination according to claim 1, in which said annular slot has its extension of depth substantially parallel to the longitudinal axis of said tubular cylinder means.

3. A unit in combination according to claim 1, which includes a metal strip inserted in said slot.

4. In combination with a cylinder head, tubular cylinder means having one end face electrobeam welded to said cylinder head along a welding seam, said cylinder means having an annular slot provided in said one end portion of said tubular cylinder means and having its extension of depth in the longitudinal direction of said tubular cylinder means, said welding seam extending from the outer circumference of said tubular cylinder means to said slot, said tubular cylinder means including an outer mantle and an inner lining inserted into said outer mantle, said annular slot being provided along the plane along which said mantle and lining meet each other.

5. In combination with a cylinder head, tubular cylinder means having one end face electrobeam welded to said cylinder head along a welding seam, said cylinder means having an annular slot provided in said one end portion of said tubular cylinder means and having its extension of depth in the longitudinal direction of said tubular cylinder means, said welding seam extending from the outer circumference of said tubular cylinder means to said slot, said slot having a depth of approximately 6mm and a width of from 0.2 to 1 mm.

6. In combination with a cylinder head, tubular cylinder means having one end face electrobeam welded to said cylinder head along a welding seam, said cylinder means having an annular slot provided in said one end portion of said tubular cylinder means and having its extension of depth in the longitudinal direction of said tubular cylinder means, said welding seam extending from the outer circumference of said tubular cylinder means to said slot, that portion of said cylinder head which is adjacent said one end face of said tubular cylinder means being provided with a centering portion, and said slot dividing the adjacent end portion of said tubular cylinder means into an inner web portion and an outer web portion, said outer web portion projecting beyond said inner web portion in the direction toward said cylinder head and engaging said centering portion.

7. A unit according to claim 6, in which between the end face of said inner web portion and the adjacent cylinder head portion there is provided a gap of approximately 0.1 mm.

* * * * *